United States Patent [19]

Takahara et al.

[11] 4,439,850
[45] Mar. 27, 1984

[54] RECORD PLAYER

[75] Inventors: Ichiro Takahara; Tadahiko Yabu, both of Moriguchi, Japan

[73] Assignee: Sanyo Electric Co., Ltd., Osaka, Japan

[21] Appl. No.: 324,394

[22] PCT Filed: Mar. 24, 1980

[86] PCT No.: PCT/JP80/00048
§ 371 Date: Nov. 16, 1981
§ 102(e) Date: Nov. 16, 1981

[87] PCT Pub. No.: WO81/02805
PCT Pub. Date: Oct. 1, 1981

[51] Int. Cl.³ .................... G11B 3/36; G11B 19/00; G11B 17/00
[52] U.S. Cl. .................... 369/77.2; 369/75.2; 369/270
[58] Field of Search ............... 369/77, 79, 270, 271, 369/75.2, 77.2

[56] References Cited
U.S. PATENT DOCUMENTS

| 4,098,511 | 7/1978 | Leedom | 369/77.2 |
| 4,109,919 | 8/1978 | Elliott et al. | 369/77.2 |
| 4,191,380 | 3/1980 | Allen et al. | 369/77.2 |
| 4,232,870 | 11/1980 | Iemenschot | 369/270 |
| 4,247,119 | 1/1981 | Hughes | 369/77.2 |

FOREIGN PATENT DOCUMENTS

| 52-71206 | 6/1977 | Japan | 369/77.2 |
| 55-45177 | 3/1980 | Japan | 369/77.2 |

*Primary Examiner*—Steven L. Stephan
*Attorney, Agent, or Firm*—Armstrong, Nikaido, Marmelstein & Kubovcik

[57] ABSTRACT

In a record player for playing a record disk on which video information is recorded, the player body is equipped with a turntable having a diameter smaller than the information-recorded surface part of the record disk, on which the record disk is pressed at its central part, and the pick-up has access from below to the information-recorded surface part of the record disk extending outwardly of the turntable surface.

4 Claims, 16 Drawing Figures

RECORD PLAYER

DESCRIPTION

1. Technical Field

The present invention relates to a record player for playing a record disk on which such high frequency signals as video information or sound signals are recorded.

2. Background of the Art

Disclosed in Patent Gazette with Patent Disclosure Nos. 53-71806 and 54-115103 is a record player on which the loading and unloading of the record disk without direct touching by hand of the record disk is made possible by using a jacket, which houses in a protective case both the record and a holder surrounding the record disk. This protection is sought because the record disk on which the video information is recorded has a signal recording surface of delicate configuration.

Heretofore, in video record players in which record jackets of this type are utilized, the record disk is turned on a turntable having a diameter larger than that of the record disk for avoidance of vertical swing which otherwise occurs when the record disk is turned. Accordingly, when transferring the record disk from a protective case to the turntable, or conversely, when returning the record disk from the turntable to the case, the large diameter turntable interferes with the operations.

Moreover, because the pick-up has access to the disk from above the disc, the record player should necessarily be designed bulky.

Disclosure of the Invention

The present record disk affords a tolerable playing characteristics, with the stabilized turning of the record disk guaranteed, even if it is not carried on a large diameter turntable, and if the pinching force is sufficiently large, even when only the signal-free part at its center is pinched.

The object of this invention is to provide a record player in which the record disk is put on a small diameter turntable of a size equal to the diameter of the signal-free part at the center of the record disk, and the central part of the record disk is pressed onto the turntable surface by means of the record disk clamping mechanism; in that way loading and unloading of the record disk is facilitated.

A further object of this invention is to provide a record player in which dust accumulation on the pick-up is not only prevented, but the apparatus may be designed less bulkily, by permitting the pick up access from below the record disk to the signal-recorded surface of the record disk extending outwardly from the turntable.

BEST MODE OF CARRYING OUT THE INVENTION

Figure 1:
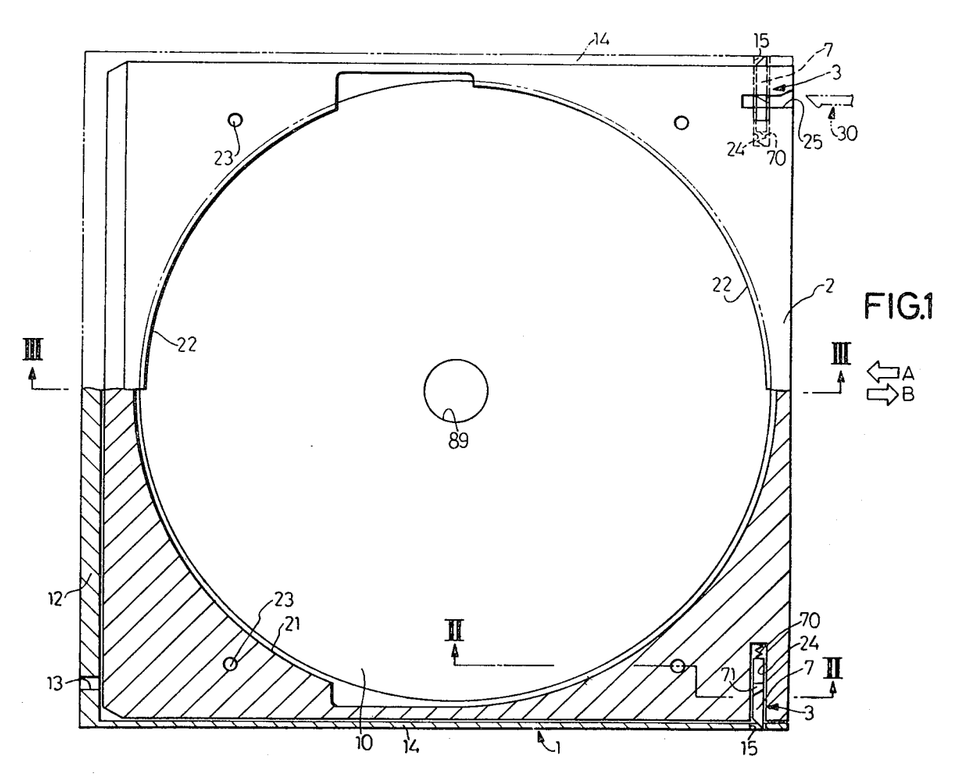
FIG. 1 shows a partially broken away, plan view of a record jacket.
Figure 2:
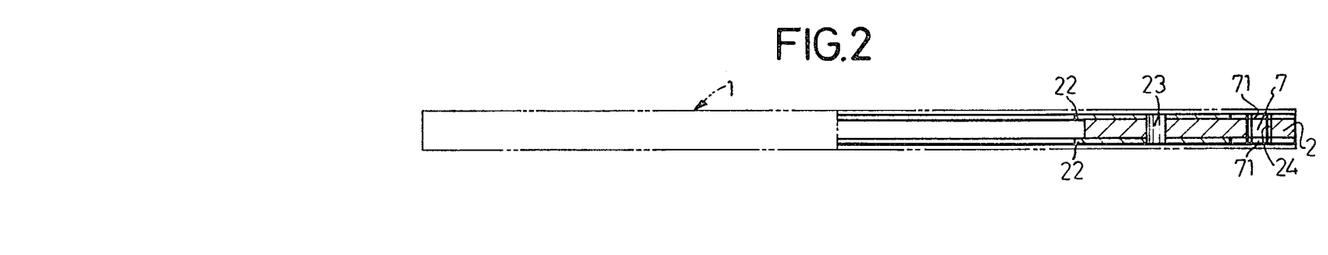
FIG. 2 provides a sectional view along the line II—II indicated in FIG. 1.
Figure 3:
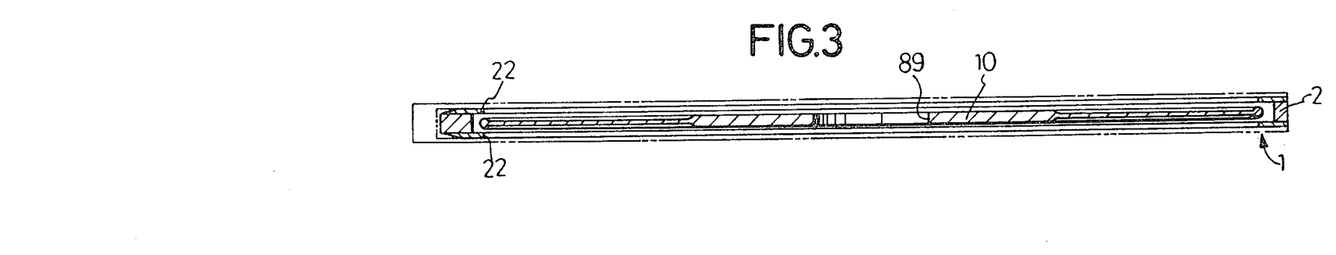
FIG. 3 gives a sectional view along the line III—III of FIG. 1.

The record jacket, as shown in FIG. 1, is equipped with an outer case 1 with a record holder 2 removably inserted therein and a locking mechanism 3 for effecting engagement and disengagement of the holder and the case.

The outer case 1 being a flat box opened forwardly, and forming the housing for the record holder 2, permits its insertion into and removal from the holder 2 through its frontal opening in the directions indicated by the arrows A and B.

In the rear wall 12 of the outer case 1, a vent hole 13 is opened, and in both side walls 14, engaging holes 15 are opened and the locking prawl 7, described later, moves in and out of the holes 15.

In the record holder 2, a circular hole 21 a little larger than the diameter of the record disk is opened at the center of a frame body a little thicker than the record disk 10. In the circular hole 21, the record disk 10 is contained, its outer circumference being surrounded thereby, and with short flanges 22 inwardly projected from the upper and lower circumferential rims of the circular hole, thereby to support the signal-free part on the perimeter of the record disk. Accordingly, the recorded surface of the record is exposed, not being covered by the holder 2.

At the four corners of the holder, positioning holes 23 corresponding to the positioning projections 77 provided on the player are located.

In the holder 2, a slot 24 is opened on one side thereof toward the engaging hole 15 at the position corresponding to the engaging hole 15 of the outer case 1, while in the upper and lower faces on both sides at the front end, notched grooves 25 which permit the unlocking piece 30 to enter are opened in the inserting and removing direction of the record holder. Each notched groove 25 intersects the aforementioned slot at right angles and at positions above and below it.

The locking mechanism 3 is composed of the locking pawl 7 housed in the slot 24 of the aforementioned record holder 2, but capable of in-and-out motion, a spring 70 arranged at the innermost part of the slot 24, for outwardly biasing the locking pawl 7 toward the engaging hole 15 in the aforementioned outer case 1, the edge of the hole 15 engaging with the tip of the locking pawl 7.

Figure 5:
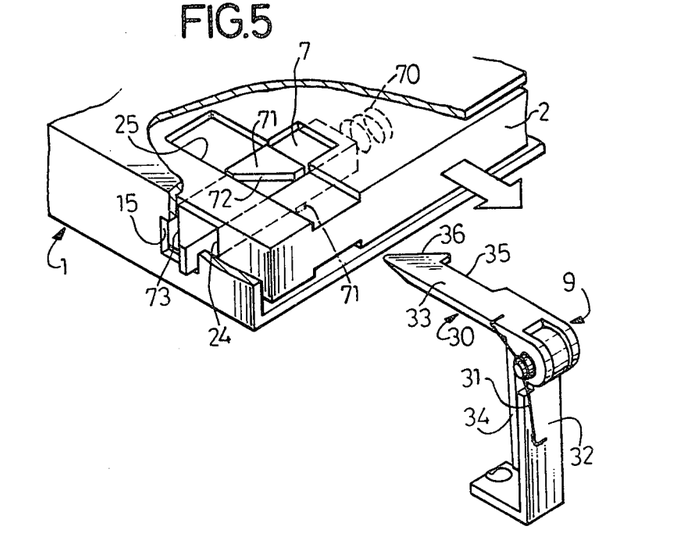
FIGS. 5 through 8 represent perspective views of the record jacket locking mechanism and unlocking mechanism, showing the conditions at the times of loading and unloading.

As shown in FIG. 5, the locking pawl 7 has cams 71 protruded from its upper and lower surfaces, the protrusion 71 having a first bevel 72 on its outward facing side surface. At the tip of the locking pawl 7, a second bevel 73 is formed on its side surface looking inward of the outer case. In the state of the record holder 2 being completely housed in the outer case, as shown in FIG.

1, the locking pawl 7 is thrust into the engaging hole 15 of the outer case 1, biased by the spring 70, thereby preventing the record holder 2 from coming out.

Figures 4, 16:
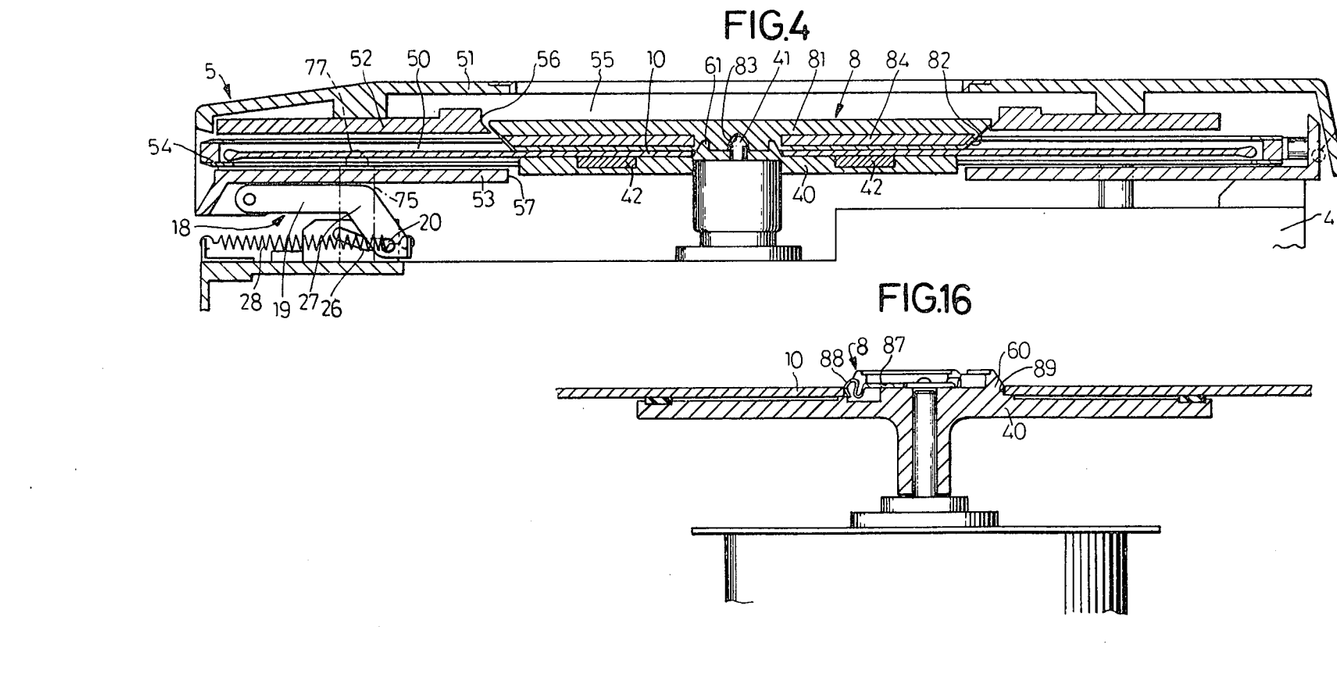
FIG. 4 presents a sectional view of the player being in the state of playing.
FIG. 16 discloses a sectional view along the line XVI—XVI of FIG. 15.

The cover body 5 of the player body 4 has, as shown in FIG. 4, the record jacket inserting space 50 and the opening 54 for its insertion and removal located between the intermediate plate 52 and the bottom plate 53. Between the intermediate plate 52 and the top plate 51, a space 55 for housing the clamping member 81 described later is formed, a circular hole 56 which permits the clamping member 81 to move in and out is opened at the center of the intermediate plate 52, and in the bottom plate 53, a cut-out hole 57 for entrance of the incoming turntable 40 and pick-up 66 is formed.

One end of the cover body 5 is pivotally mounted on the pivot axis 58. At the other end of the cover body 5 are mounted the spring 28 for biasing the cover body 5 for up-motion, the first locking mechanism 18 which determines the level of the up-motion and the second locking mechanism 44 (see FIG. 9) which disengageably locks the cover body 5 at its lowered position.

The first locking mechanism 18 has one end of the stay 19 fixed on the cover body 5, its guide strip 27 mounted on the player body, and the pin 20 at the tip of the stay 27 engaged in the guide groove 26 of the guide strip 27, enabling the cover body 5 to be opened and closed within the range permitted by the guide groove 26.

The aforementioned spring 28 is mounted between the player body and the stay tip, and by the tension of this spring 28, the cover body 5 is biased for upward motion.

Figure 9:
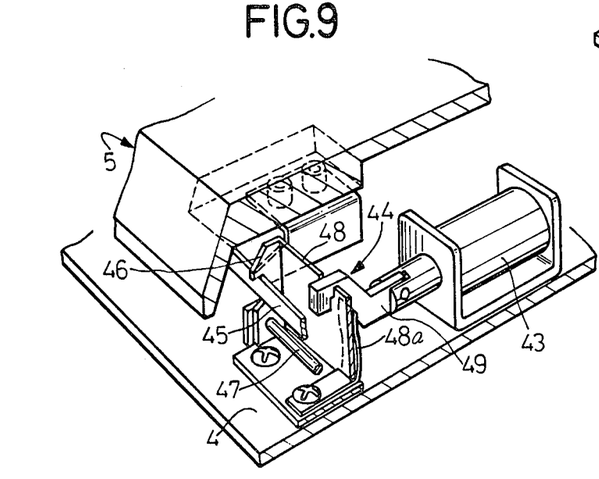
FIG. 9 denotes a perspective view of the second locking mechanism.

The second locking mechanism 44 has, as shown in FIG. 9, the locking bar 45 on the bottom surface of the cover body, while on the player body, a locking piece 48 pivotally mounted on the supporting axis 47 is provided. The locking piece 48 has a bevel 46 above a notch on which the bar 45 is hooked, and it is biased to its erect posture by means of a spring 48a. The plunger 49 of a solenoid 43 is linked with the locking piece 48, so that the engagement between the locking bar 45 and the locking piece 48 may be undone by energizing the solenoid 43 to let the plunger 49 draw in the locking piece 48.

Figure 10:
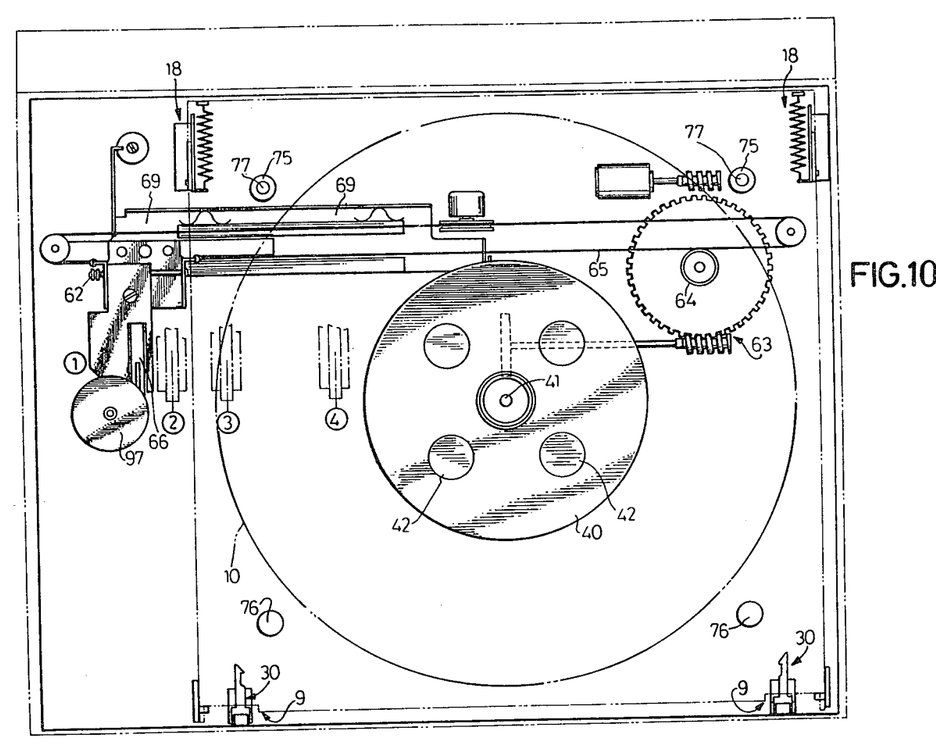
FIG. 10 designates a plan view of the player body.

On both sides of the lower edge of the cover body 5, as shown in FIG. 10, the unlocking mechanisms 9 for the record jacket locking mechanisms are provided.

Figure 11:
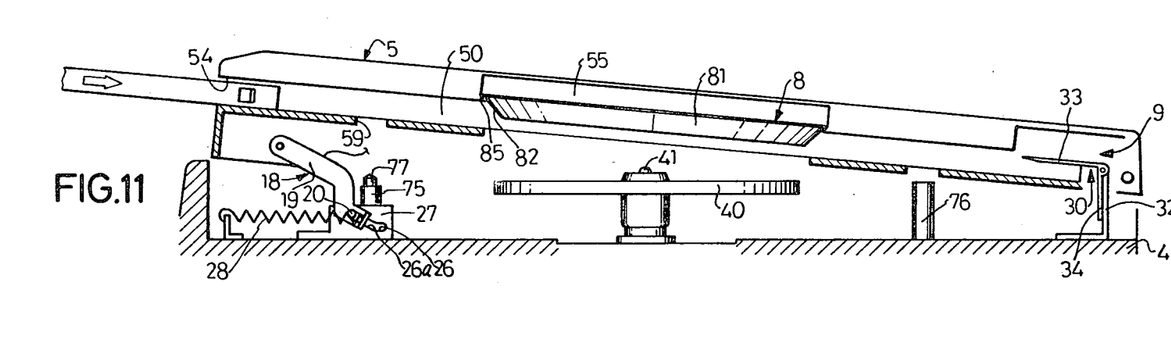
FIGS. 11 through 14 display sectional views of this record player, showing the conditions of the cover body, record jacket and the pick-up at the times of loading and unloading.

The unlocking mechanism 9 has, as shown in FIGS. 5 and 11, a rotatable part of an L-shaped unlocking piece 30 pivotally mounted on the top of the supporting plate 32 projected vertically upward from the player body, and has the pawl part 33 at the tip of the said unlocking piece turned toward the opening side of the cover body 5, and a vertical stopper piece 34 underneath the unlocking piece 30.

The aforementioned pawl part 33 is provided with a hooked part and a recessed part contiguous thereto, the bevel 36 on the hooked part being nearly parallel to the first bevel 72 of the aforementioned locking pawl 7.

The unlocking piece 30, being normally biased downwardly by means of the spring 31, is kept in its stationary position with its stopper piece 34 abutting the supporting plate 32. In this stationary position, the unlocking piece 30 may enter into the notched groove 25 of the record holder 2, when the record jacket is brought in.

The turntable 40 of the player body is formed to have a diameter smaller than that of the circular circumference of the signal recorded-surface of the record disk 10, and has a plurality of magnets 42 embedded in its upper surface part. On the central part of the upper surface of the turntable 40, a boss 61 gradually tapered upward is formed, with a center pin 41 projected out from the center of the boss 61.

Surrounding the turntable 40, four pins 75, 75, and 76, 76 are standing erect.

Each of these pins pierces the through-hole 59 opened in the bottom plate 53 of the cover body 5, and abuts on the bottom surface of the record holder 2, and being larger in diameter than the positioning hole of the record holder 21 supporting the holder 2 horizontally and at a proper level for the record disk 10 carried on the turntable surface where the upper and lower flanges 22 22 of the holder 2 are clear thereof. Furthermore, from the two pins 75 75, bits 77 77 which are engaged in the positioning holes 23 of the aforementioned record holder 2 are protruded. The positioning of the record holder 2 is made by the aid of the said two bits 77 and the boss 61 of the turntable 40 described later.

On the turntable 40, the record disk clamping means 8 is provided, with which to press onto the turntable surface the record disk 10 carried on the turntable 40.

The clamping means 8, has its clamping member 81 housed between the top plate 51 and the intermediate plate 52 of the cover body 15.

The clamping member 81 is formed in a disk shape having a downward taper surface 82 on its outer circumferential rim with a ring shaped plate 84 embedded in the bottom surface part, and is provided with a centering hole 83 on its bottom surface. Part of the clamping member 81 protrudes into the jacket inserting space 50 by its own weight, when it is in position in the cover body, as shown in FIG. 11, and its outer peripheral rim is supported by the inner peripheral rim of the intermediate plate 52.

Figure 13:
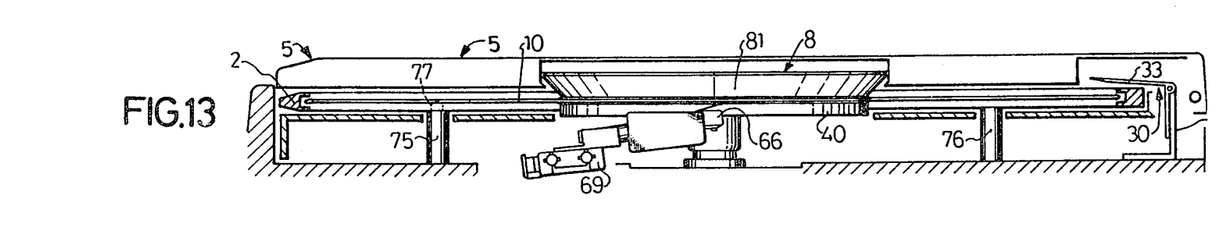
Figure 14:
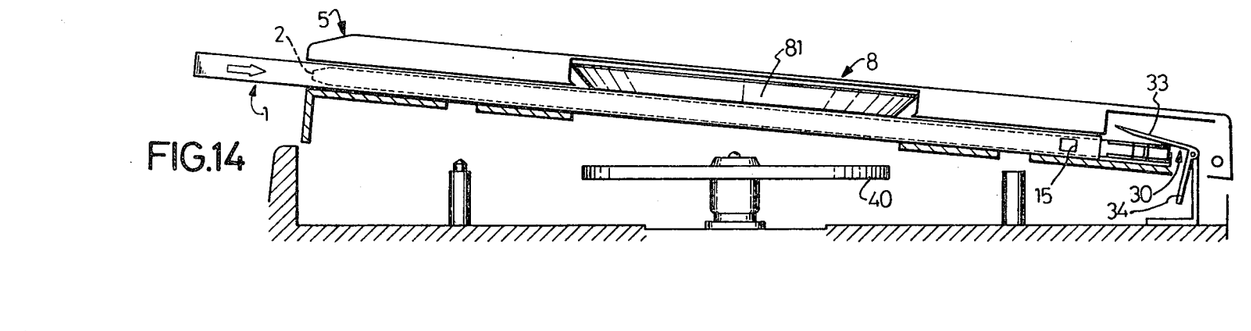

The pick-up 66 makes a reciprocal motion in engagement with the swingable rail stand 69 placed at a level lower than the turntable surface, as shown in FIGS. 10 and 13, and has access from below to the signal-recorded surface of the record disk carried on the turntable 40, and extending outwardly of the table surface. The rotary power of the motor (not shown in this figure) which drives the turntable is transmitted to the wire 65 through the reduction gearing 63 and drum 64, to transfer the pick-up 66. The rail stand 69 is pivotally held by the supporting axis 62 in its down position, but at the playing time, it turns up to the state of FIG. 13 by the action of the solenoid (not shown in this figure) interlocked to the rail stand 69.

The pick-up 66 proceeds in every cycle of playing along the successive positions; the regrinding position 1, pick-up replacing position 2, play starting position 3 and play ending position. At the regrinding position, the needle grinding board 97 is arranged.

In the following the operation of the player is described:

(Loading)

As the record jacket is being inserted in the direction indicated by an arrow from the inlet opening of the cover body 5 when it is held at its up position, as shown in FIGS. 5 and 11, the forward end of the outer case 1 goes forward by pushing up the tapered surface of the clamping member 81. Then, the record jacket passes beneath the clamping member 81.

As the record jacket reaches the inner-most end of the inserting space 50, the pawl part 33 of the unlocking piece 30 goes into the notched groove 25 at the front of the jacket, and in the midway of its entrance, the bevel 36 of the pawl part 33 abuts on the first bevel 72 of the locking pawl 7.

Figure 6:
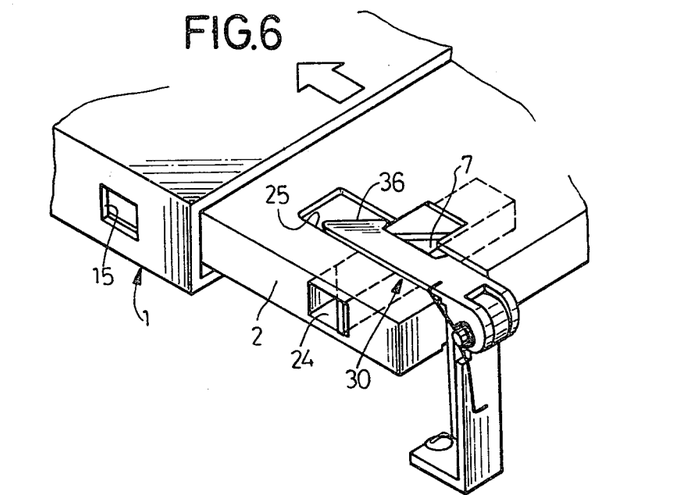
Figure 12:
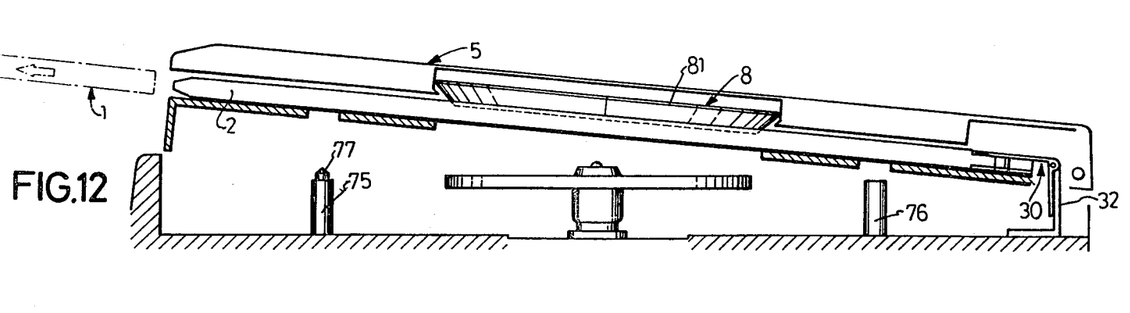

By further proceeding with the insertion of the unlocking piece, the locking pawl 7 may be pushed inwardly in defiance of the force of the spring 70 by means of the pawl part 33. At the position where this insertion is completed, the protrusion 71 of the locking pawl 7 is bound by the recessed part 35 of the unlocking piece, thereby undoing the locking of the outer case 1 by means of the locking pawl 7 (FIG. 6). Then, the outer case 1 may be separated and taken off from the holder 2, leaving in the player the record holder 2 which is being engaged by the unlocking piece 30 (FIG. 12).

Figure 7:
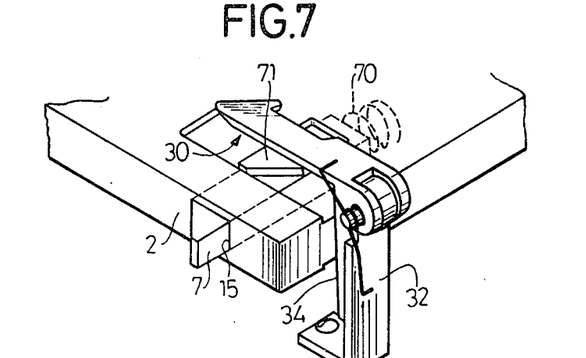
Figure 8:
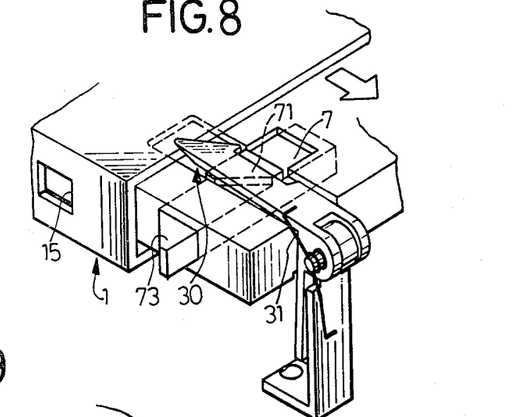

Then, as shown in FIG. 13, as the cover body 5 is brought down, the vertical portion of the unlocking piece 30 encounters the supporting plate 32, and is restricted from turning further thereby, whereby its engagement with the locking pawl 7 is undone. Accordingly, the locking pawl 7 is restored to its former projecting position by the action of the spring 70 (FIG. 7). While going down, the record disk 10 in the record holder 2 is placed on the turntable 40 disposed just below it. The holder 2 is now supported by the pins 75 and 76 without allowing the outer circumferential rim of the record disk 10 to touch on the flange 22, so that the record disk 10 may be turned clear of the holder 2.

Whereupon the clamping member 81 inside the cover body 5 is attracted record toward the turntable side by means of a magnet 42 in the turntable 40; then, the record disk 10 is pressed onto the turntable 40 by the clamping member 81. Thus, perfectly clamped loading of the record disk is accomplished.

(Playing)

As the turntable 40 turns, the record disk 10 makes a turn in unison with the clamping member 81, being pinched thereby.

The pick-up 66, after moving to a position beneath the signal recorded surface of the record disk 10, is brought in light touch with the bottom surface of the record disk 10 by the tilting of the rail stand 69. In that way, the playing is started in the well-known manner.

(Unloading)

After the playing operation is accomplished, the solenoid 43 is activated, triggered by the depression on the stop button on the panel of the player body, for example; as a result, the locking by the second locking mechanism 44 is undone, permitting the cover body 5 to go up in defiance of the attracting force of the magnet 42 in the turntable 40. It is then transferred to its up position, together with the record holder. The rail stand 69 and the pick-up 66 are restored to their former positions. Whereupon, the protrusion 71 of the locking pawl 7 of the record holder 2 brings up the unlocking piece 30 in defiance of the action of the spring 31. Then, as an empty outer case 1 is being thrust into the cover body, the record holder 2 may be received in the outer case in pace with its motion. Immediately before completing its insertion, the outer case 1 abuts on the second bevel 73 of the locking pawl 7. Then, by proceeding with this insertion, the said locking pawl 7 may be pushed back in defiance of the spring 70, enabling the locking pawl to retreat into the inside surface of the outer case. On the other hand, the unlocking piece 30 brought up on the protrusion 71 permits the outer case 1 to come under it, and it is further brought up by the entrance of the outer case. Just when the outer case is in its completely inserted position, the locking pawl 7 is engaged in the engaging hole 15 of the outer case, whereby the record holder 2 is locked to the outer case 1. By taking out this outer case, the record disk 10 together with the record holder in the outer case is recovered. Thus, the unloading has now been accomplished. At this time, the unlocking piece 30 is restored to its normal position by the action of the spring 31, to be ready for the next loading operation.

Figure 15:
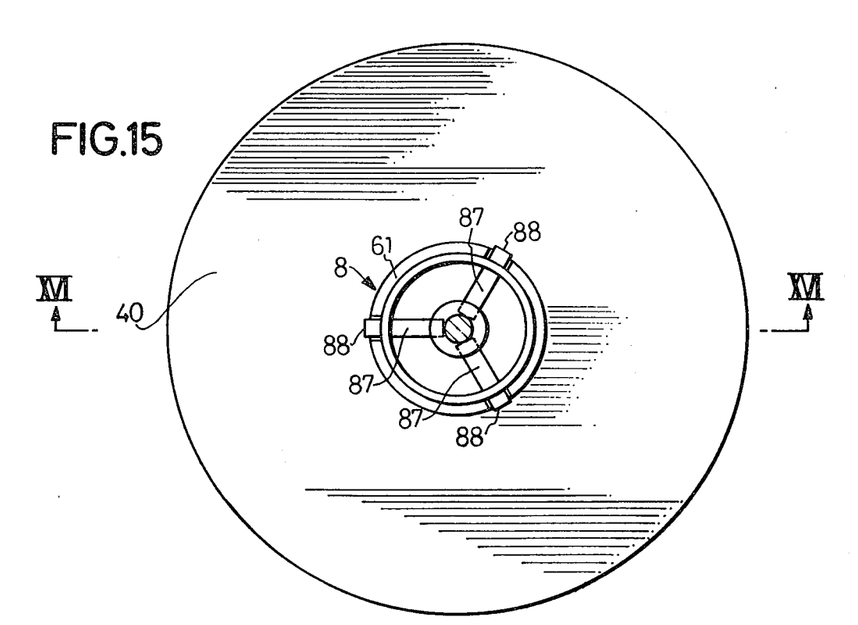
FIG. 15 exhibits a plan view of a modified embodiment of the record disk clamping mechanism.

For the record clamping means 8, an embodiment shown by FIGS. 15 and 16 may be utilized. The said clamping means is of a construction such that a plurality of spring strips 87 are radially arranged at equal angular intervals inside the boss 60 of the turntable 40; each spring strip 87 has its outer end rounded to project outwardly, the projecting part 88 extending radially past and hooking over the outer circumferential surface of the boss 61. As the record disk 10 and the holder 2 are brought into the inserting space 50 of the cover body 5, as described hereabove, and by closing down the cover body 5, the record disk 10 is brought down toward the turntable 40 side. While the record disk is going down, the inner circumferential rim of its hole 89 is caught by the projecting part 88 of the spring strip 87, causing the central part of the record disk to be slightly raised, but its outer circumferential part droops by its own weight, to be in a slightly curved state. As the turntable 40 begins to turn, a radial tensile stress is placed on the record disk by the centrifugal force; then, the shape of the record disk approaches the state of a flat plate; consequently, the inner circumferential rim of the hole of the record disk rides over the projecting part of the spring strip 87, and is pressured onto the turntable surface by the endmost downward-going bevel of the projecting part of each spring strip 87. In the unloading, the record disk 10 is forced upward past the level of the spring strips 87 by raising the cover body 5, enabling the taking-out of the record disk 10, as here-above described. According to this embodiment, with no clamping member provided on the cover body, the player may be reduced in weight, or designed less bulkily, moreover, with no rubbing of the clamping means on the jacket taking place, the jacket is free from injury when being inserted into the cover body.

The scope of this invention is not limited to the claims as defined by the description given above in reference to the accompanying drawings. It is obviously easy for those normally skilled in the art to devise varied alternatives without departing from the spirit of this invention as covered by the claims set forth hereunder.

We claim:

1. In a record player for use with a record jacket having a record disk therein, said record player having a liftable cover body pivoted at one end and free at the opposite end, and having a side face at said free end with an inlet formed in said side face, and said record jacket comprising a holder surrounding the outer circumference of said record disk, an outer case in which the said holder is removably inserted, and locking means for locking said holder into said outer case, said record jacket being inserted into the inlet provided at the side face of the free end of said liftable cover body wherein after insertion said outer case may be withdrawn from said record player leaving said record disk and said holder within said cover body, the improvement comprising:

a turntable within said record player, said turntable having a diameter smaller than that of the signal-recorded portion of said record disk, said turntable supporting said record disk when said record disk is inserted into said record player;

a cover body lifting means for biasing said cover body to an open position for the insertion and withdrawal of said record jacket, said lifting means including holding means for holding the cover body in a closed position when said record disk is being played;

an unlocking means for unlocking said locking means when said record jacket is inserted into said cover body;

said cover body including means for supporting said holder therein after said record jacket has been withdrawn such that said record disk is automatically positioned on said turntable when said cover body is in a closed position;

a record disk clamping means disposed in said cover body and movable towards and away from engagement with said record disk, said record disk clamping means facing the central portion of said record disk supported on said turntable when the cover body is closed for pressing the central portion of said record disk onto the turntable surface;

a pick-up means positioned at a level below the turntable surface for detecting a recorded signal on said record disk from a position below the signal-recorded portion of said record disk, said signal-recorded portion extending radially outward from the turntable surface.

2. A record player according to claim 1, wherein said cover body lifting means comprises a spring for biasing said cover body towards the open position and wherein said holding means comprises a first locking mechanism connected to said cover body for restricting the opening movement of said cover body, a second locking mechanism for detachably engaging said cover body, when said cover body is in the closed position to thereby hold said cover body in said closed position, and a solenoid means connected to said second locking mechanism for releasing the engagement between said second locking mechanism and said cover body.

3. A record player according to claim 1, wherein said record disk clamping means includes a magnet embedded in the turntable and a magnetizable metal insertable into said record jacket, such that when said record jack is inserted into said cover body, said magnetizable metal is opposed to said magnet.

4. A record player according to claim 1, wherein such record disk clamping means includes a plurality of spring strips positioned at the central portion on the top surface of said turntable, each spring strip having a projecting part extending radially outward.

* * * * *